W. P. COOK.
TESTER.
APPLICATION FILED MAR. 8, 1921.
1,422,742.
Patented July 11, 1922.
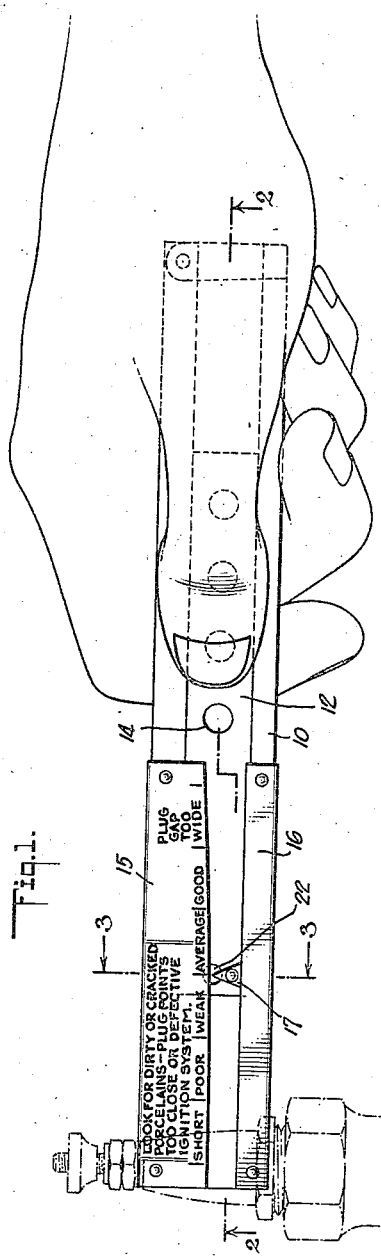
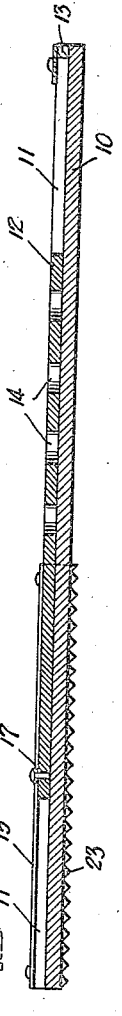
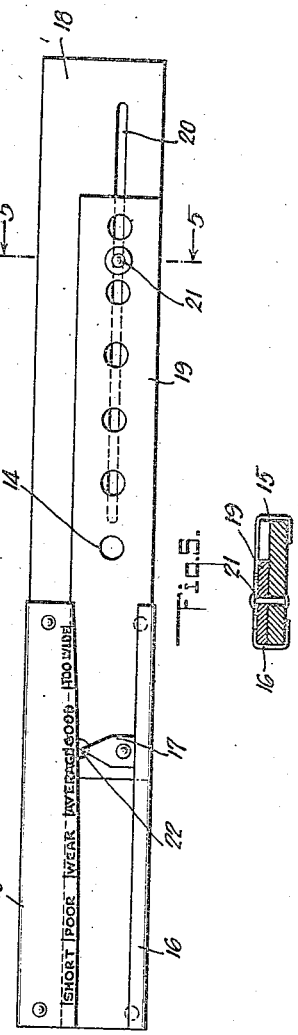
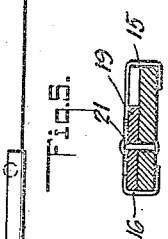
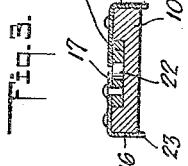
WITNESSES
Frederick Diehl.
INVENTOR
W. P. Cook
BY
ATTORNEYS

UNITED STATES PATENT OFFICE.

WILLIAM PEDRICK COOK, OF LARAMIE, WYOMING.

TESTER.

1,422,742.  Specification of Letters Patent.  Patented July 11, 1922.

Application filed March 8, 1921. Serial No. 450,611.

*To all whom it may concern:*

Be it known that I, WILLIAM P. COOK, a citizen of the United States, and resident of Laramie, in the county of Albany and State of Wyoming, have invented a new and Improved Tester, of which the following is a full, clear, and exact description.

My invention relates to a tester, and aims to provide a device of this nature which will serve to indicate the proper operation of the circuit together with the quality of spark produced by means of the plug associated with said circuit.

Although my invention is not limited to this particular adaption, it is primarily intended for use in connection with the testing of spark plugs, such as are used in internal combustion engines.

It is well appreciated in internal combustion engines, that considerable difficulty is experienced in that it is noted that explosions are being missed. It is then incumbent upon the operator of the vehicle, or other person testing the same to short-circuit each of the spark plugs. Upon short-circuiting that plug associated with the cylinder which is missing, no spark will result, and the person forming this test will immediately know that this is the cylinder which is operating in a faulty manner.

It has also been customary to utilize a metallic body, and to ground one end of the same, and to bring the opposite end into proximity of the central terminal of each of the spark plugs. A spark will then be perceptible between the end of the metallic object, and the central electrode, as the current will ground in this manner, due to the fact that the same will follow the path of least resistance.

This is at best a very poor way of testing the flow of the current, in that the person testing the same is oftentimes "shocked" and due to the faults of a manual performance of this nature, it is impossible to determine with any degree of accuracy, the quality of the spark produced.

With this in view, devices have been placed upon the market, which devices embodied a pair of leads contacting with the ground, and a central electrode respectively, the inner ends of these leads terminating in a gap. Upon the application of a device of this nature in the manner specified, the current bridged the gap and so an operator was capable of primarily determining which cylinder was missing, and secondly as to whether the current was flowing as far as the central electrode.

However, no construction was embodied to permit of a testing of the quality of the spark, i. e. as to whether the same was normally "hot" or "lean." Incident to this fault of prior devices, it was impossible for an operator to determine as to whether the plugs might contain defective insulating material, as to whether the coil was faulty, and finally as to whether the blame was to be placed upon the condition of the plugs, such as the gap being too wide, small, or the points thereof dirty.

With this in view, I have constructed a tester which shall primarily be capable of not alone determining as to whether current is flowing into the central terminal of a spark plug, but which will also indicate the quality of the spark produced, so that the operator may actually determine the condition of the parts of the ignition system.

A further object of my invention is the construction of a tester which shall be in the nature of an accessory, and shall be extremely simple in construction, aside from the fact that the same, shall embody qualities permitting of its use by an inexperienced person.

Further objects of my invention will appear in the annexed specification and drawings, which latter present practical embodiments of my invention, and in which—

Figure 1 is a side view of a tester constructed in accordance with my conception, and showing the same in applied position.

Figure 2 is a sectional plane view taken along the lines 2—2 of Figure 1.

Figure 3 is a sectional view taken along the lines 3—3 of Figure 1.

Figure 4 is a side view of a slightly different form of tester than that illustrated in Figure 1, and Figure 5 is a sectional end view taken along the line 5—5 of Figure 4.

In these views the reference numeral 10 indicates the base plate, preferably of fibre, or other suitable insulating material, and, in the forms illustrated in Figures 1 to 3, is provided with a longitudinally extending groove 11, forming a track for a slide 12, mounted within said groove.

The slide 12 is also provided of material similar to that of the base plate 10, so that no fear of current conductivity may be felt. A stop plate 13 may be fixed to the base plate 10, adjacent one end of the groove 11, and thus prevent any removal of the slide 12 from this end of the base plate, and it will be seen in the manner indicated in Figure 1, that the base plate may be gripped by the hand and the thumb brought to bear upon the slide 12, to project or retract the same within the groove 11 for a purpose hereinafter more fully specified.

In this connection it is to be noted that the slide 12 may be provided with a series of openings or depressions 14 which will serve to provide a grip for the thumb so that the action aforespecified may be readily accomplished.

It is also to be noted that a pair of plates 15 and 16, respectively, may be conveniently affixed to the base plate 10 adjacent the outer end of the same, it being noted that these plates conveniently overlap the groove 11 so that the slide 12 is prevented from falling therefrom, irrespective of the angle of inclination of the base plate.

It will also be seen, that the plate 15 is provided with an overlapping portion of gradually increasing width, and it will also be noted that a metallic member 17 is affixed to the slide 12, contacting with the overlapping portion of the plate 16, along one of its edges, its apex being spaced from the outer edge of the overlapping portion of the plate 15.

Thus it will be appreciated that upon a projection of the slide 12, that the gap existent between the apex of the metallic member 17 and the outer edge of the plate 15 will be varied, and in this connection it will be noted that the plate 15 may conveniently bear certain indicating means which will permit the operator to judge the quality of the spark in accordance with the gap which it is capable of bridging.

From the foregoing it will be appreciated that it will be a simple matter for an operator to bring the plates 15 and 16 in contact with the central terminal, and shell of a spark plug respectively, thus providing a circuit which will contact with the "ground" and source of current supply.

It will also be noted that the current will be caused to pass through the base of the plate 16, this passage being permitted by means of the metallic member 17, which, as aforestated, is capable of being moved to permit of a varying of the width of the gap to indicate the quality of the spark and hence, as to whether the parts are properly adjusted, and operating up to the highest efficiency of which they are capable.

In the forms illustrated in Figures 4 and 5, it will be seen that the base plate 18 is provided upon which the slide 19 is longitudinally movable. Contrary, however, to the construction illustrated in Figures 1 to 3, connection between the slide and base plate is established by means of a slot 20, within which a pin 21 affixed to the slide 19 rides.

In this form, a pair of plates are also shown, which plates serve as a guide for the slide, as well as providing the variable gap feature aforedescribed. It is also to be noted that in both of the forms illustrated, that an opening 22 is conveniently provided in the slide at a point to the rear of, and in line with the apex of the metallic member 17.

This opening provides an air space which permits the jumping of the current across the gap. It will also be noted that the form illustrated in Figures 1 to 3 differs from that illustrated in Figures 4 and 5, in that the plates 15 and 16 are extended, as has been indicated by the reference numeral 23, so that a suitable form of contact means for bearing against the shell, and terminal of the spark plug may be provided.

Thus, I have constructed a testing device, in the nature of a marketable accessory, which is extremely simple in construction, and hence economical in this connection, and by means of which trouble in the ignition system may be intelligently located at the expenditure of a minimum amount of time, and which finally may be utilized by a person who is not an expert in this line.

Obviously numerous modifications of structure might readily be resorted to without in the least departing from the spirit of my invention, which I claim as—

1. A tester including a pair of metallic members spaced one from the other, one of said members presenting an inclined longitudinal edge adapted to co-operate with the second of said members, and means for moving said second member with respect to said first named member.

2. A tester, including a body plate, a slide longitudinally movable upon said body plate, a metallic plate secured to said body plate, and a metallic member secured to said slide, said metallic plate being of varying width, said member being adapted to be spaced from the edge of said plate.

3. A tester, including a body plate, a slide secured to said plate and longitudinally movable with respect thereto, a metallic member secured to said slide, a pair of metallic plates secured to said body plate, one of said metallic plates contacting with the said member, the second of said metallic plates being of gradually increasing width, said member being spaced from said last named plate.

4. A tester, including a body plate, a slide secured to said plate and longitudinally movable with respect thereto, a metallic member secured to said slide, a pair of metallic plates secured to said body plate, one of said metallic plates contacting with the said member, the second of said metallic plates being of gradually increasing width, said member being spaced from said last named plate, said slide being formed with an opening in line with the space existent between said member and the plate spaced therefrom.

WILLIAM PEDRICK COOK.